(12) United States Patent
Seo

(10) Patent No.: US 8,358,449 B2
(45) Date of Patent: Jan. 22, 2013

(54) DEVICE AND METHOD FOR DETECTING DOCUMENT SIZE

(75) Inventor: In Chang Seo, Seongnam-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 580 days.

(21) Appl. No.: 12/604,141

(22) Filed: Oct. 22, 2009

(65) Prior Publication Data

US 2010/0103479 A1     Apr. 29, 2010

(30) Foreign Application Priority Data

Oct. 24, 2008  (KR) .................... 10-2008-0104833

(51) Int. Cl.
*H04N 1/04* (2006.01)
(52) U.S. Cl. ......... 358/474; 358/486; 358/497; 399/379
(58) Field of Classification Search .......... 358/474, 358/497, 486, 488; 399/379, 380
See application file for complete search history.

(56) References Cited

U.S. PATENT DOCUMENTS

| | | | | |
|---|---|---|---|---|
| 5,168,373 A * | 12/1992 | Nakamura | .................... | 358/406 |
| 5,568,573 A * | 10/1996 | Wada et al. | .................... | 382/317 |
| 6,191,405 B1 * | 2/2001 | Mishima et al. | .......... | 250/208.1 |
| 6,433,896 B1 * | 8/2002 | Ueda et al. | .................... | 358/488 |
| 7,715,066 B2 * | 5/2010 | Michiie | ........................ | 358/474 |
| 7,813,010 B2 * | 10/2010 | Michiie et al. | ................. | 358/474 |
| 8,134,753 B2 * | 3/2012 | Ishido et al. | .................. | 358/449 |
| 8,248,670 B2 * | 8/2012 | Shinkawa | ..................... | 358/449 |
| 2004/0190089 A1 * | 9/2004 | Tsutsumi | ...................... | 358/505 |
| 2009/0026689 A1 * | 1/2009 | Noguchi et al. | ............... | 271/8.1 |
| 2009/0244649 A1 * | 10/2009 | Shinkawa | ..................... | 358/474 |

FOREIGN PATENT DOCUMENTS

JP  2007-028185  2/2007

OTHER PUBLICATIONS

English language abstract of JP 2007-028185, published Feb. 1, 2007.
Machine English language translation of JP 2007-028185, published Feb. 1, 2007.

* cited by examiner

*Primary Examiner* — Negussie Worku
(74) *Attorney, Agent, or Firm* — Stanzione & Kim, LLP

(57) ABSTRACT

A device for, and a method of, detecting a document size are disclosed. The disclosed device and method can detect the speed at which the document plate cover is being closed, and can adjusting the timing of the document size detection based in part on the detected speed of the cover closure. When the cover is being closed at a relatively low speed, the document size detection can be delayed. When the cover is being closed at a relatively high speed, the document size detection can be performed sooner. The document size detection can thus be performed with the cover being in a suitable position.

19 Claims, 10 Drawing Sheets

FIG. 4

| Size | a | b | c | d | e |
|------|---|---|---|---|---|
| A3   | O | O | O | O | O |
| B4   | O | O | X | O | O |
| A4   | O | O | O | X | X |
| A4R  | O | X | X | X | O |
| B5   | O | O | X | X | X |
| B5R  | X | X | X | X | O |
| A5   | O | X | X | X | X |

DEVICE AND METHOD FOR DETECTING DOCUMENT SIZE

CROSS-REFERENCE TO RELATED APPLICATION(S)

This application claims the benefit of Korean Patent Application No. 2008-0104833, filed on Oct. 24, 2008 in the Korean Intellectual Property Office, the disclosure of which is incorporated herein by reference in its entirety.

TECHNICAL FIELD

The present disclosure relates generally to a device and a method for detecting a document size, and, more particularly, to a device and a method for detecting a document size, to automatically detect a document size and to record the document image on recording paper of an appropriate size.

BACKGROUND OF RELATED ART

When the size of a document is larger than a recording paper size, the entire image of the document cannot be printed on the recording paper. On the other hand, when the document size is smaller than the recording paper size, an excessive margin in the recording paper may result.

An image forming apparatus, such as, for example, a copying machine, a scanner, or the like, thus typically includes a document size detection device that automatically detects the size of the document. Such document size detection device may include a plurality of reflective optical sensors positioned at predetermined locations in a document plate, and detects the document size based on the signals received from the reflective optical sensors indicative of whether a document to be reproduced is placed on the document plate covering the various location of the respective reflective optical sensors.

Unfortunately, however, because in the above described conventional document size detection device the document size detection is carried out at a predetermined time after the cover starts to close without regards to the speed at which the cover is being closed, a document size detection error can occur due the variance in the amount of available ambient light, and due to the effect of such varying amount of light incident upon the document size detection sensors, depending on the position of the cover at the time of the document size detection.

For example, if the cover is closed at a relatively high speed, the cover may be completely closed before the document size detection takes place, causing small to no amount of ambient light reaching the detection sensors. If, on the other hand, the cover is closed at a relatively low speed, the document size detection may take place while the cover may be still wide open, causing a large quantity of ambient light incident upon the document size detection sensors. Thus a document size detection device capable of mitigating the adverse effect of the variance in the amount of ambient light is desirable.

SUMMARY OF DISCLOSURE

In accordance with an aspect of the present disclosure, a method of detecting the size of a document placed on a document plate can be provided to include the steps of: detecting a speed at which a cover of the document plate is closed; adjusting a timing of document size detection based on the detected speed; and detecting the size of the document at the adjusted document size detection timing.

The step of adjusting the timing may comprise: determining whether the detected speed is a predetermined normal speed; and adjusting the timing of document size detection if the detected speed is not the predetermined normal speed.

The step of adjusting the timing may further comprise: delaying the timing of document size detection with respect to a reference timing associated with the predetermined normal speed if the detected speed is slower than the predetermined normal speed; and advancing forward the timing of document size detection with respect to the reference timing if the detected speed is faster than the predetermined normal speed.

The step of adjusting the timing may further comprise: adjusting the timing of document size detection by an amount of time proportional to a difference between the detected speed and the predetermined normal speed.

According to another aspect of the present disclosure, a device for detecting a size of a document may be provided to include a main body, a cover, a sensor, a sensing unit and a control unit. The main body may include a document plate on which the document is to be placed. The cover may be moveably coupled to the main body so as to open or cover the document plate. The sensor may be provided in the main body to detect the size of the document. The sensing unit may be configured to detect the closure speed at which the cover moves in the direction to cover the document plate. The control unit may be configured to adjust the timing at which the sensor detects the size of the document based at least in part on the closure speed detected by the sensing unit.

The sensing unit may comprise an actuator configured to move in cooperation with the cover and a sensor configured to sense a moving speed of the actuator.

The actuator may have an end portion that includes one of an elongated groove and a hole.

The sensor may comprise an optical sensor having a light emitting element and a light receiving element spaced apart from each other. The actuator may include a first sensed portion and a second sensed portion spaced apart from each other. The first sensed portion and the second sensed portion may be arranged such that as the actuator moves each of the first sensed portion and the second sensed portion is capable of being positioned in an optical path between the light emitting element and the light receiving element.

The control unit may be configured to determine the closure speed based on the time duration during which the first sensed portion of the actuator blocks the optical path between the light emitting element and the light receiving element.

In the alternative, the control unit may be configured to determine the closure speed based on the time duration during which the actuator moves from a first position at which the first sensed portion of the actuator is positioned to block the optical path between the light emitting element and the light receiving element of the sensor to a second position at which the second sensed portion of the actuator is positioned to block the optical path between the light emitting element and the light receiving element of the sensor.

The control unit may be configured to adjust the timing at which the sensor detects the size of the document in response to a determination of the closure speed being slower or faster than a predetermined normal speed.

The control unit may be configured to delay the timing if the detected closure speed is determined to be slower than the predetermined normal speed. The control unit may be configured to advance forward the timing if the detected closure speed is determined to be faster than the predetermined normal speed.

The control unit may be configured to adjust the timing by an amount of time proportional to a difference between the detected closure speed and the predetermined normal speed.

According to yet another aspect, an apparatus for reading an image of a document may be provided to include a document plate, a cover for the document plate, one or more document size sensors, an actuator and a controller. The document plate may define the surface on which to place the document. The cover may be arranged to move relative to the document plate to thereby selectively expose and cover the surface of the document plate. The one or more document size sensors may be arranged below the surface of the document plate, and may be configured to detect the size of the document. The actuator may be arranged to come into an interfering contact with the cover so as to move in cooperation with the cover. The controller may be configured to adjust the timing at which the one or more document size sensors detect the size of the document based at least in part on a position of the actuator.

The apparatus may further comprise an actuator sensor. The actuator sensor may be arranged adjacent the actuator, and may be configured to sense the position of the actuator. The controller may be configured to receive from the actuator sensor one or more signals indicative of the detected position of the actuator, and may be configured to determine a closure speed at which the cover moves in a direction to cover the surface of the document plate based on the time duration during which the actuator moves from a first position to a second position.

The actuator sensor may comprises a light source and a light detector spaced apart from and opposingly facing each other so as to define an optical path from the light source to the light detector. At least a portion of the actuator may block the optical path when the actuator is in the first position. The optical path may not be blocked by the when the actuator is in the second position.

Alternatively, the actuator may comprise a first and a second extension members spaced apart from each other. The actuator sensor may comprise a light source and a light detector spaced apart from and opposingly facing each other so as to define an optical path from the light source to the light detector. When the actuator is in the first position, the first extension member of the actuator may be positioned to block the optical path. The second extension member of the actuator may be positioned to block the optical path when the actuator is in the second position.

The controller may further be configured to compare the detected closure speed of the cover with a reference speed.

The controller may further be configured to delay the timing at which the one or more document size sensors detect the size of the document if the closure speed is determined to be slower than the reference speed, and may be configured to advance forward the timing at which the one or more document size sensors detect the size of the document if the closure speed is determined to be faster than the reference speed.

BRIEF DESCRIPTION OF THE DRAWINGS

Various features and advantages of the present disclosure will become apparent and more readily appreciated from the following description of several embodiments thereof, taken in conjunction with the accompanying drawings of which:

FIG. 4 is a table usable to discriminate the document size in a document size detection device according to an embodiment of the present disclosure;

DETAILED DESCRIPTION OF SEVERAL EMBODIMENTS

Figure 1:
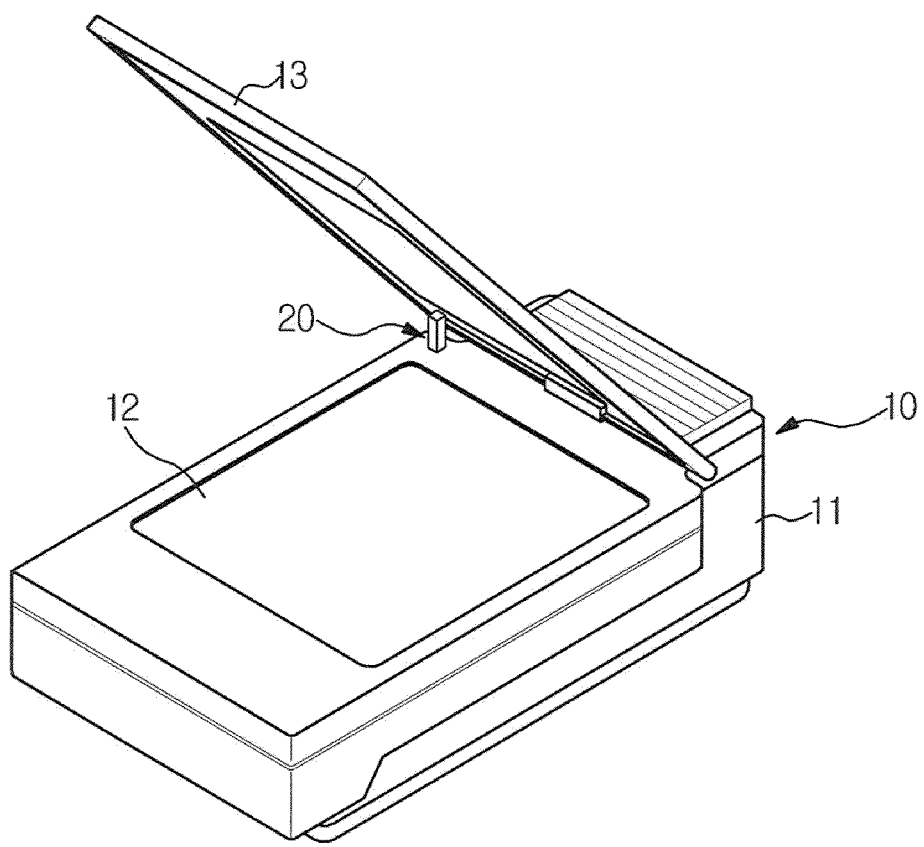
FIG. 1 is a perspective view illustrating an exterior appearance of a scanner equipped with a document size detection device according to an embodiment of the present disclosure.

Reference will now be made in detail to several embodiments, examples of which are illustrated in the accompanying drawings, wherein like reference numerals refer to the like elements throughout.

Figure 2:
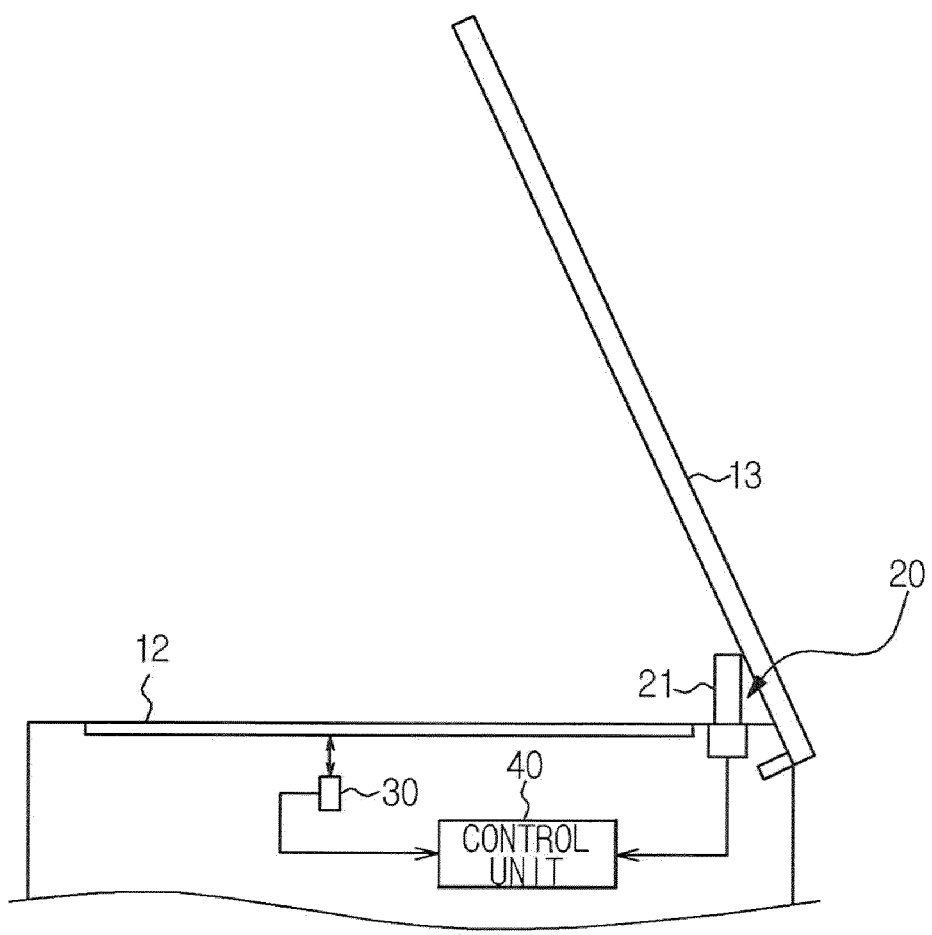
FIG. 2 is a view illustrating a constitution of the document size detection device according to an embodiment of the present disclosure.

FIG. 1 shows an example of an exterior appearance of a scanner that may be equipped with a document size detection device according to an embodiment of the present disclosure. FIG. 2 shows the constitution of a document size detection device according to an embodiment of the present disclosure.

Referring to FIGS. 1 and 2, a scanner 10 according to an embodiment may be equipped with a document size detection device, and may include a main body 11, a document plate 12 arranged in the top portion of the main body 11 and a cover 13 that may be hingedly coupled to the main body 11. The cover 13 serves to cover the document plate 12 when the cover 13 is closed.

A document size detection device according to an embodiment may includes a sensing unit 20 mounted near the document plate 12, reflective optical sensors 30 disposed below the document plate 12 in the main body 11 and a control unit 40 to perform the control operation herein described.

According to an embodiment, the sensing unit 20 may be configured to output a signal indicative of the cover 13 being open, for example, when the cover forms an angle larger than a predetermined angle (e.g., 80 degrees) with the document plate 12. The sensing unit 20 may further be configured to output a signal when the cover 13 begins to close, that is the angle between the cover 13 and the document plate 12 becomes smaller than the predetermined angle (e.g., 80 degrees). The sensing unit 20 may additionally be configured to output a signal corresponding to the speed at which the cover 13 is being closed.

According to an embodiment, while the cover 13 is being closed, the control unit 40 may be configured to receive the signals from the sensing unit 20, and to, based on the received signals, determine whether the cover 13 is open (i.e., with an angle greater than a predetermined angle), whether the closure of the cover 13 has started and the speed at which the cover 13 is being closed. Based on such determinations, the control unit 40 may be configured to adjust the time at which the document size detection is to take place. At such adjusted document size detection time, the control unit 40 may receive the signals from the plurality of reflective optical sensors 30, and may determine the size of the document size based on the signals.

Each of the reflective optical sensors 30 may include one or more light emitting element(s) that are configured to emit light toward the document plate 12 and one or more light receiving element(s) configured to receive the light reflected off the document plate 12. When the document is located at a position above a particular reflective optical sensor 30, because the light from the light emitting element is reflected by the document, a larger quantity of reflected light is may be received by the light receiving element corresponding to the particular reflective optical sensor 30. On the other hand, when a document is placed so as to not cover the position above the particular reflective optical sensor 30, because the light from the light emitting element may be reflected in directions other than back toward the light receiving element, the quantity of light transmitted to the light receiving element may be less.

Figure 3:
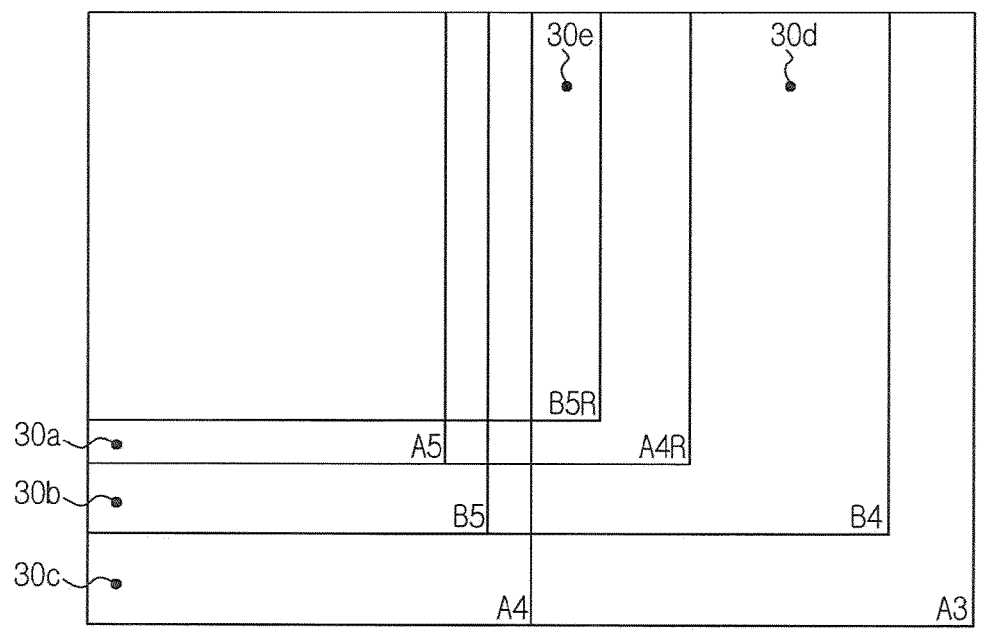
FIG. 3 is a plan view illustrating arrangement of sensors in a document size detection device according to an embodiment of the present disclosure.

While only a single reflective optical sensor 30 is shown in FIG. 2, it should be understood that a plurality of sensors may be disposed under the document plate. An illustrative example of the arrangement of the reflective optical sensors is depicted in FIG. 3. As shown in FIG. 3, the reflective optical sensors 30a, 30b and 30c may be disposed at respective positions to detect the documents of A5, B5 and A4 sizes, respectively, along the width direction of the document plate 12. The reflective optical sensors 30e and 30d may be disposed at respective positions to detect the documents of B5R, A4R, B4 and A3 sizes along the lengthwise direction of the document plate 12. FIG. 3 also shows a relation between the arrangement of the reflective optical sensors 30a to 30e and the document size with respect to the document plate 12.

With the above described arrangement of the reflective optical sensors 30a to 30e, the relation between the respective sensor signals and the document size is illustrated in FIG. 4. Referring to FIG. 4, the parameters a to e correspond to the reflective optical sensors 30a to 30e. When a document is detected at the respective positions of the reflective optical sensors 30a to 30e, such detection is indicated with an 'O.' When a document is not detected at the respective positions of the reflective optical sensors 30a to 30e, such non-detection is indicated with an 'X.' According to an embodiment, the Based on the control unit 40 may utilize the table shown in FIG. 4 in determining the document size.

Figure 5:
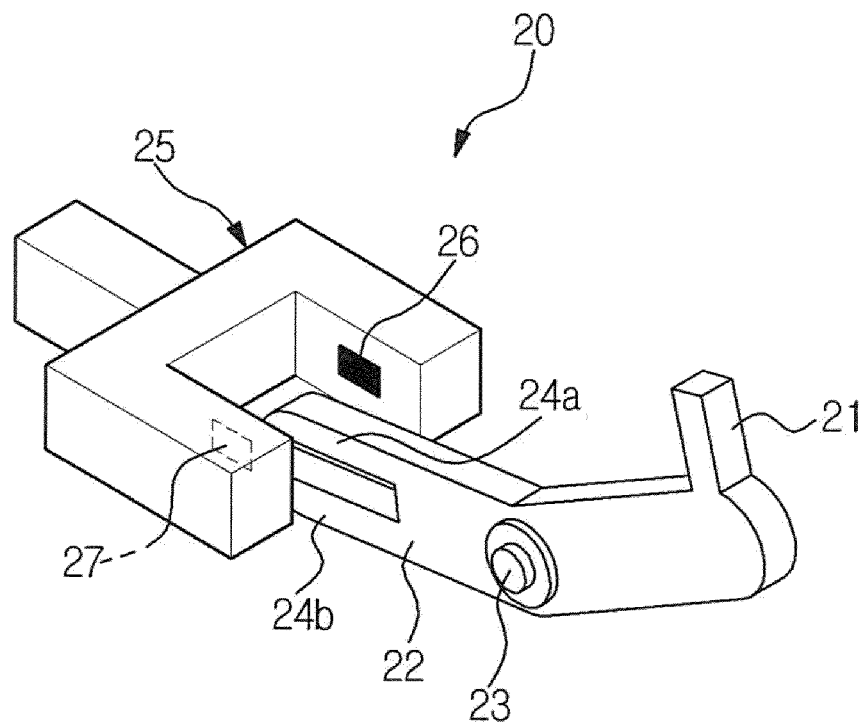
FIG. 5 is a view illustrating a sensing unit to sense the opening/closing of a cover, and the speed of such opening/closing, in a document size detection device according to an embodiment of the present disclosure.

As shown in FIG. 5, the sensing unit 20 according to an embodiment may include an actuator 22 configured to move in cooperation with the opening/closing operation of the cover 13 and an optical sensor 25 configured to sense the movement, and the speed of the movement, of the actuator 22. The optical sensor 25 according to an embodiment may include a light emitting element 26 and a light receiving element 27 arranged to opposingly face each other.

The actuator 22 may be provided so as to perform a seesaw-like motion in cooperation with the opening/closing operation of the cover 13. A pressed part 21 may be provided at one end portion of the actuator 22. While the cover 13 is being closed, the cover may come into a pressing contact with the pressed part 21. When the cover 13 becomes open, the pressing contact between the pressed part 21 and the cover 13 may be released. A first sensed part 24a and a second sensed part 24b may be provided to be spaced apart from each other at the other end portion of the actuator 22. The first sensed part 24a and the second sensed part 24b may be movably located between the light emitting element 26 and the light receiving element 27 of the optical sensor 25.

A fixed part 23 is provided at the middle portion of the actuator 22, and may be hingedly supported on the body of the sensing unit 20 or the main body 11 of the scanner. When the cover 13 is being closed, the pressed part 21 is pressed by the cover 13, causing the actuator to pivot about the fixed part 23, and in turn causing the first sensed part 24a and the second sensed part 24b may move past an optical path between the light emitting element 26 and the light receiving element 27 of the optical sensor 25.

The optical sensor 25 may include the light emitting element 26 to emit light and the light receiving element 27 to receive the light from the light emitting element 26. The light emitting element 26 and the light receiving element 27 may be arranged to opposingly face each other. The optical sensor 25 may be configured to output different signals depending on whether or not the light path from the light emitting element 26 to the light receiving element 27 is interrupted by the seesaw motion of the actuator 22. For example, when the first sensed part 24a or the second sensed part 24b of the actuator 22 is located in the optical path between the light emitting element 26 and the light receiving element 27, the optical sensor 25 may output a first signal (e.g., LOW). When the first sensed part 24a or the second sensed part 24b is not located in the optical path, the optical sensor 25 may output a second signal (e.g., HIGH), different from the first signal. Therefore, the optical sensor 25 can sense the movement and the moving speed of the actuator 22. The control unit 40 may be coupled to the optical sensor 25 to receive therefrom the sensor signals, and based on the sensed movement and the speed of the actuator 22, may determined not only whether the cover 13 is being closed or is open, but also the speed at which the cover 13 is being closed.

When the cover 13 becomes open, for example, with an angle greater than a predetermined angle, the cover 13 releases the depressed part 21, and thus does not cause a movement of the actuator 22. Such state of the actuator 22 when the cover 13 is open is illustrated in FIG. 5. As shown in FIG. 5, because the first sensed part 24a and the second sensed part 24b of the actuator 22 are located at a position away from the optical path between the light emitting element 26 and the light receiving element 27, the light receiving element 27 receives the light emitted from the light emitting element 26. Therefore, the optical sensor 25 outputs a HIGH signal.

Figure 6:
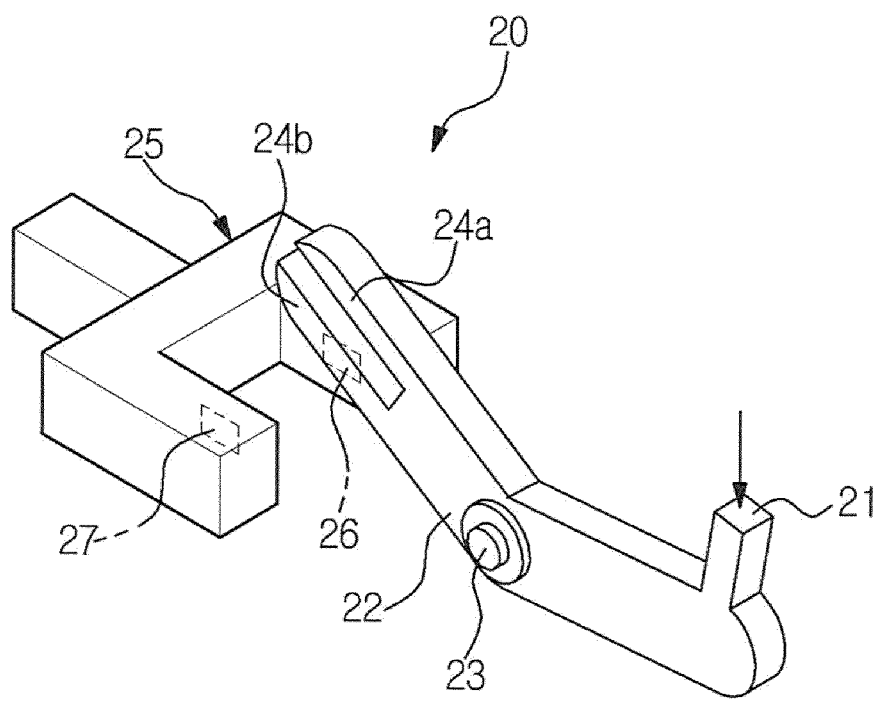
FIG. 6 is a view illustrating operation of the sensing unit shown in FIG. 5.

On the other hand, as the cover 13 is being closed, the cover 13 begins to press on the pressed part 21 of the actuator 22, causing the actuator 22 to pivot. The state of the actuator 22 when the cover 13 is completely closed is illustrated in FIG. 6. As shown in FIG. 6, when the cover 13 starts to close, the first sensed part 24a and the second sensed part 24b sequentially moves past the optical path between the light emitting element 26 and the light receiving element 27 by the seesaw motion of the actuator 22. Therefore, the signals outputted from the optical sensor 25 is sequentially changed in an order of HIGH, LOW, HIGH and LOW.

Figure 7:
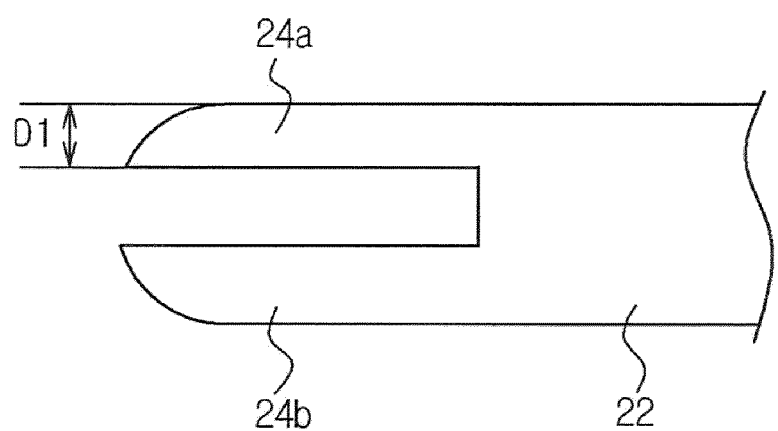
FIG. 7 is a partial cross-sectional view of an actuator of the sensing unit shown in FIG. 5.
Figure 8:
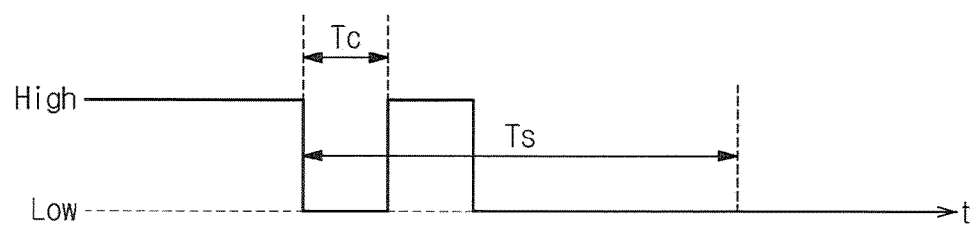
FIG. 8 is a timing diagram showing output signals from the sensing unit according to an embodiment of the present disclosure.

As shown in FIG. 7, according to an embodiment, one end portion of the actuator 22 may be formed to include the first sensed part 24a and the second sensed part 24b of the actuator 22 configured as sensed protrusions and a sensed recess having a predetermined width formed between the sensed protrusions. A reference letter D1 in FIG. 7 denotes the width of the first sensed part 24*a*. When the cover 13 is closed from the open state, the upper sensed protrusion, the sensed recess and the lower sensed protrusion of the actuator 22 pass sequentially through the optical path region between the light emitting element 26 and the light receiving element 27. Accordingly, as shown in FIG. 8, the optical sensor 25, which has been outputting a HIGH signal while the cover 13 is open, sequentially outputs signals of LOW, HIGH and LOW. It should be noted that the configuration of the end portion of the actuator 22 may take a variety of different shapes and features. For example, according to an alternative embodiment, the actuator 22 may include an opening or a hole in lieu of the afore-described sensed recess.

As shown in FIG. 8, while the cover 13 is being closed from the open state, the signal output from the optical sensor 25 may change in the order of HIGH, LOW, HIGH and LOW. During the signal change, the duration of the signal in one changed state may vary according to the speed at which the cover 13 is being closed. For example, if the cover 13 is closed at a speed lower than a normal speed, the duration, for example, Tc, during which the signal is LOW, may be shorter in comparison to such duration associated with the normal or a reference speed. If the cover 13 is closed at a speed higher than a reference speed, the duration, for example, Tc, may be longer in comparison to that associated with the reference speed. Thus, when the cover 13 is closed at a relatively low speed, the document size detection time Ts should be delayed in relation to a normal detection of time. When, on the other hand, the cover 13 is closed at a relatively high speed, the document size detection time Ts should be advanced with respect to the normal detection time. With such timing adjustment, it may be possible to perform the document size detection when the cover 13 is positioned at an angle or a range of angles that may reduce the likelihood of adverse interference of the ambient light.

The speed Ws at which the cover 13 is being closed can be expressed according to the following equation (1).

$$Ws = \Delta A / \Delta T = AD1 / Tc \quad \text{Equation (1)}$$

In the above Equation (1), Ws denotes the speed at which the cover is being closed, $\Delta A$ denotes the change in the angle of the cover 13 by which the cover is rotated, $\Delta T$ denotes the duration of time during the rotation of the cover 13, D1 denotes the width of the first sensed part 24*a*, AD1 denotes the rotational angle of the cover when the actuator moves by D1, while Tc denotes the duration of time during which the signal output from the optical sensor 25 is initially LOW.

Figure 9:
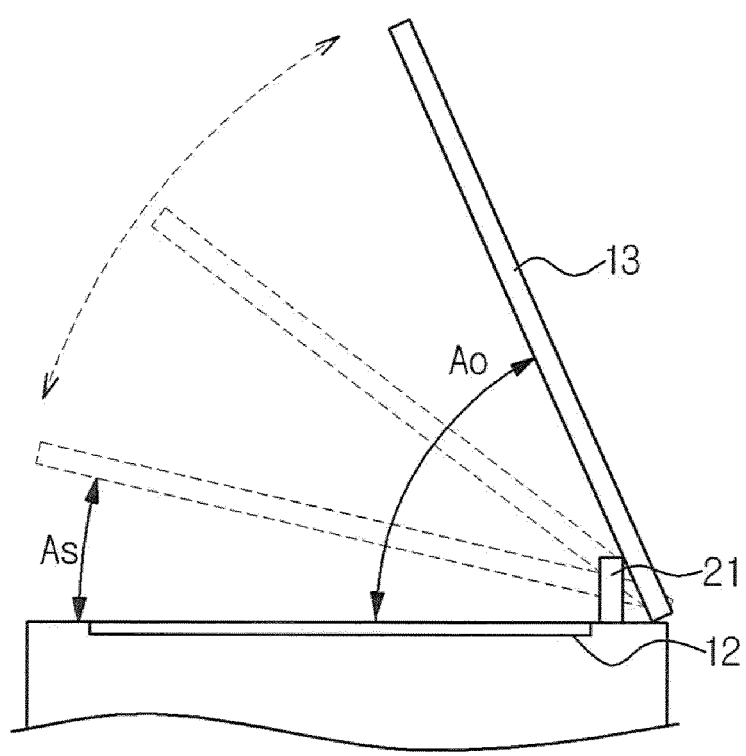
FIG. 9 is a view illustrating the various angles of a cover according to an embodiment of the present disclosure.

As shown in FIG. 9, if the angle of the cover 13 when the cover 13 is opened is denoted by Ao, and if the angle of the cover 13 at which the document size detecting operation is performed is denoted by As, an optimal document size detection time according to the speed at which the cover 13 is being closed can be determined according to the following equation (2).

$$Ts = (Ao - As)/Ws = (Ao - As) * Tc / AD1 \quad \text{Equation (2)}$$

In the above Equation (2), Ts denotes the document size detection time, Ws denotes the speed at which the cover 13 is being closed, D1 denotes the width of the first sensed part 24*a*, AD1 denotes the rotational angle of the cover when the actuator moves by D1, and Tc denotes the duration of time during which the signal output from the optical sensor 25 remains LOW after the initial changed from HIGH to LOW.

Figure 10:
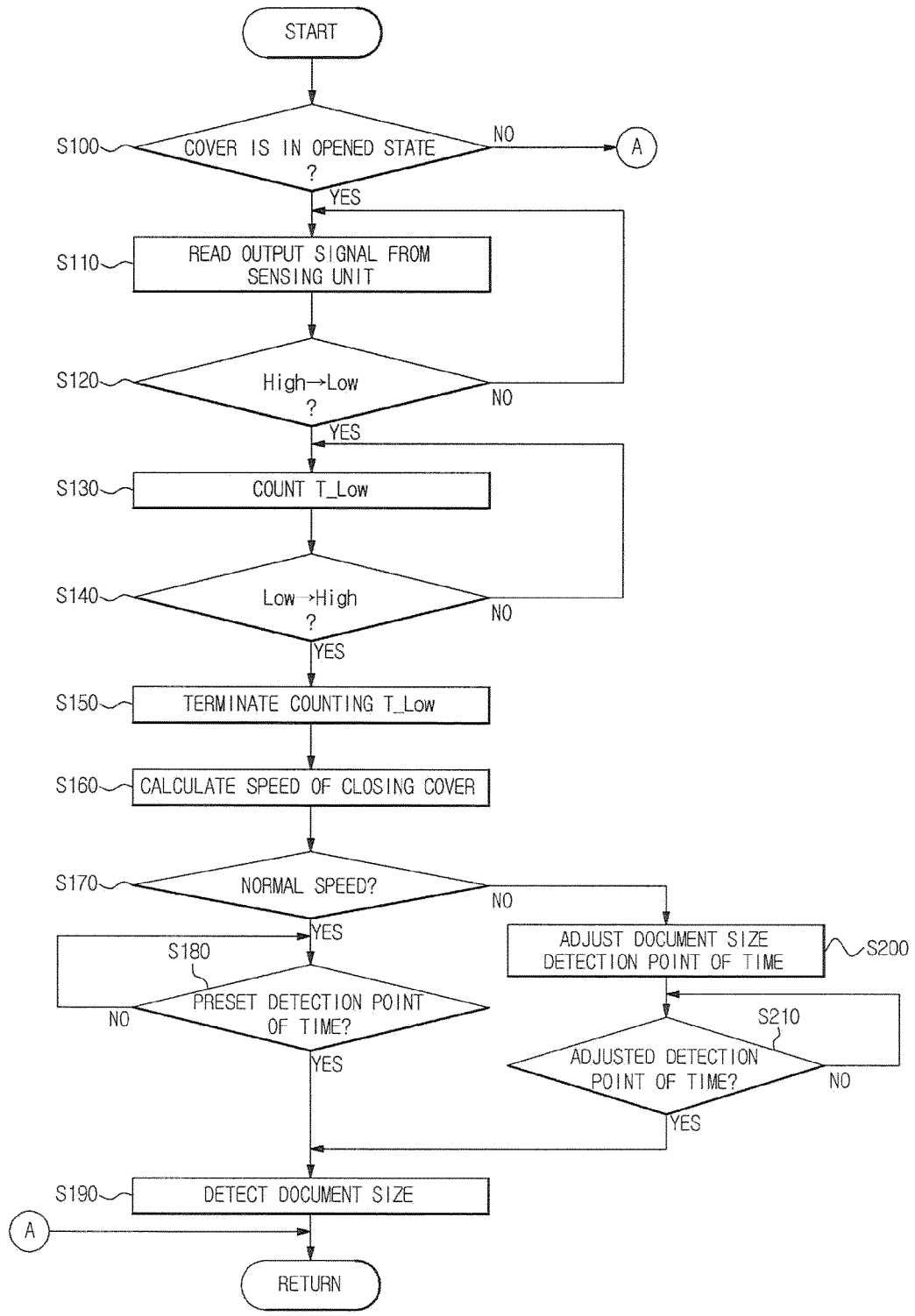
FIG. 10 is a flow chart showing a document size detection control method according to an embodiment of the present disclosure.

FIG. 10 is a flow chart of a document size detection method according to an embodiment of the present disclosure.

Referring to FIG. 10, the control unit 40 determines whether the cover 13 is in an open state at operation S100. For example, according to an embodiment, if the output signal from the sensing unit 20 is maintained in a state of HIGH for a predetermined time or longer, the control unit 40 may determine that the cover 13 is in an opened state.

If it is determined that the cover is in the open state, the control unit 40 may read the output signal from the sensing unit 20 at operation S110, and make a determination of whether the output signal from the sensing unit 20 is changed from HIGH to LOW at operation S120. If it is determined that the output signal from the sensing unit 20 is not changed from HIGH to LOW, the process returns to operation S110. According to an alternative embodiment, the control unit 40 may be configured to be interrupted by the change of the output signal of sensing unit 20 rather than performing repeated readings of the output signal of the sensing unit 20.

If it is determined in operation S120 that the output signal from the sensing unit 20 is changed from HIGH to LOW, the control unit 40 counts or otherwise determines the time duration T_LOW during which the signal output from the sensing unit 20 remains in the LOW state, at operation S130.

Thereafter, the control unit 40 determines whether the output signal from the sensing unit 20 is changed from LOW to HIGH at operation S140. If it is determined that the output signal from the sensing unit 20 is not changed from LOW to HIGH, the process returns to operation S130.

If it is determined in operation S140 that the output signal from the sensing unit 20 is changed from LOW to HIGH, the control unit 40 terminates the counting of the time duration T_LOW at operation S150.

Then, by using the time T_LOW, the control unit 40 calculates the speed at which the cover 13 is closed, at operation S160. According to an embodiment, the speed at which the cover 13 is closed may be calculated according to the equation (1).

Thereafter, the control unit 40 determines whether the speed at which the cover is closed is the normal speed at operation S170. If it is determined in operation S170 that the speed at which the cover 13 is being closed is the normal speed, the control unit 40 determines whether the present time is the document size detection time preset for the normal cover closure speed at operation S180. For example, according to an embodiment, the control unit 40 may determine whether a predetermined time has elapsed since the start of the closure of the cover 13, that is, since the time of the output signal from the sensing unit 20 changing from HIGH to LOW.

If it is determined that the current time is the preset detection time, the control unit 40 detects the document size at operation S190. For example, according to an embodiment, the control unit 40 may read signals from the respective reflective optical sensors 30*a* to 30*e* provided below the document plate 12, and may determine the document size based on the document size discrimination table of FIG. 4.

If however it is determined in operation S170 that the speed at which the cover 13 is being closed is not the normal speed, the control unit 40 adjusts the document size detection time at operation S200. Then, the control unit 40 determines whether it is currently the adjusted document size detection time at operation S210, and, if it is so determined, the control unit 40 carries out the document size detection at operation S190, for example, using the reflective optical sensors 30*a* to 30*e* and the document size discrimination table of FIG. 4. In adjusting the document size detection time, when the cover 13 is being closed at a speed that is slower than the normal speed, the control unit 40 may delay the document size detection time in relation to the preset detection time associated with the normal speed. If, on the other hand, the cover 13 is being closed at a speed faster than the normal speed, the control unit 40 may advance the document size detection time in relation to the preset detection time associated with the normal speed. According to an aspect of the present disclosure, by making the above described adjustment to the document size detection timing, the detection of the document size can advantageously be performed with the cover 13 being in a suitable position or within a range of suitable positions.

It would be readily understood by those skilled in the art that the control unit 40 may be, e.g., a microprocessor, a microcontroller or the like, that includes a CPU to execute one or more computer instructions to implement the control operations herein described relating to the document size detection or various other control operations relating to other components of the scanner 10, and that, to that end, the control unit 40 may further include a memory device, e.g., a Random Access Memory (RAM), Read-Only-Memory (ROM), a flesh memory, or the like, to store the one or more computer instructions.

As should be apparent from the above descriptions, a device for, and a method of, detecting the document size according to an aspect of the present disclosure can detect the speed at which the cover of the document plate is closed, and can adjust the timing of the document size detection operation based at least in part on the detected speed of the cover closure. For example, when the cover is closed at a relatively low speed, the document size detection may be delayed so that the document size detection does not occur with the cover widely open. On the other hand, when the cover is closed at a relatively high speed, the document size detection timing may be advanced so that the document size detection can be achieved before the cover is completely closed. As a result, the document size detection can more accurate.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. A method of determining a size of a document placed on a document plate, comprising:
   detecting a speed at which a cover of the document plate is closed with a sensing unit;
   adjusting a timing of document size detection based on the detected speed with a control unit; and
   detecting the size of the document with a sensor at the adjusted document size detection timing.

2. The method according to claim 1, wherein the adjusting the timing comprises:
   determining whether the detected speed with the control unit is a predetermined normal speed; and
   adjusting the timing of document size detection with the control unit if the detected speed is not the predetermined normal speed.

3. The method according to claim 2, wherein the adjusting the timing further comprises:
   delaying the timing of document size detection with respect to a reference timing associated with the predetermined normal speed with the control unit if the detected speed is slower than the predetermined normal speed; and
   advancing forward the timing of document size detection with respect to the reference timing with the control unit if the detected speed is faster than the predetermined normal speed.

4. The method according to claim 3, the adjusting the timing further comprises:
   adjusting the timing of document size detection by an amount of time proportional to a difference between the detected speed and the predetermined normal speed with the control unit.

5. A device for detecting a size of a document, comprising:
   a main body including a document plate on which the document is to be placed;
   a cover moveably coupled to the main body so as to open or cover the document plate;
   a sensor provided in the main body to detect the size of the document;
   a sensing unit configured to detect a closure speed at which the cover moves in a direction to cover the document plate; and
   a control unit configured to adjust a timing at which the sensor detects the size of the document based at least in part on the closure speed detected by the sensing unit.

6. The device according to claim 5, wherein the sensing unit comprises:
   an actuator configured to move in cooperation with the cover; and
   a sensor configured to sense a moving speed of the actuator.

7. The device according to claim 6, wherein the actuator has an end portion that includes one of an elongated groove and a hole.

8. The device according to claim 6, wherein the sensor comprises an optical sensor having a light emitting element and a light receiving element spaced apart from each other, and
   wherein the actuator includes a first sensed portion and a second sensed portion spaced apart from each other, the first sensed portion and the second sensed portion being arranged such that as the actuator moves each of the first sensed portion and the second sensed portion is capable of being positioned in an optical path between the light emitting element and the light receiving element.

9. The device according to claim 8, wherein the control unit is configured to determine the closure speed based on a time duration during which the first sensed portion of the actuator blocks the optical path between the light emitting element and the light receiving element.

10. The device according to claim 8, wherein the control unit is configured to determine the closure speed based on a time duration during which the actuator moves from a first position at which the first sensed portion of the actuator is positioned to block the optical path between the light emitting element and the light receiving element of the sensor to a second position at which the second sensed portion of the actuator is positioned to block the optical path between the light emitting element and the light receiving element of the sensor.

11. The device according to claim 5, wherein the control unit is configured to adjust the timing at which the sensor detects the size of the document in response to a determination of the closure speed being slower or faster than a predetermined normal speed.

12. The device according to claim 11, wherein the control unit is configured to delay the timing if the detected closure speed is determined to be slower than the predetermined normal speed, and
   wherein the control unit is configured to advance forward the timing if the detected closure speed is determined to be faster than the predetermined normal speed.

13. The device according to claim 12, wherein the control unit is configured to adjust the timing by an amount of time proportional to a difference between the detected closure speed and the predetermined normal speed.

14. An apparatus for reading an image of a document, comprising:
- a document plate defining a surface on which to place the document;
- a cover arranged to move relative to the document plate to thereby selectively expose and cover the surface of the document plate;
- one or more document size sensors arranged below the surface of the document plate and configured to detect a size of the document;
- an actuator arranged to come into an interfering contact with the cover so as to move in cooperation with the cover; and
- a controller configured to adjust a timing at which the one or more document size sensors detect the size of the document based at least in part on a position of the actuator.

15. The apparatus of claim 14, further comprising:
- an actuator sensor arranged adjacent the actuator and configured to sense the position of the actuator,
- wherein the controller is configured to receive from the actuator sensor one or more signals indicative of the detected position of the actuator, and is configured to determine a closure speed at which the cover moves in a direction to cover the surface of the document plate based on a time duration during which the actuator moves from a first position to a second position.

16. The apparatus of claim 15, wherein the actuator sensor comprises a light source and a light detector spaced apart from and opposingly facing each other so as to define an optical path from the light source to the light detector, and
- wherein at least a portion of the actuator blocks the optical path when the actuator is in the first position, the actuator not blocking the optical path when the actuator is in the second position.

17. The apparatus of claim 15, wherein the actuator comprises a first and a second extension members spaced apart from each other,
- wherein the actuator sensor comprises a light source and a light detector spaced apart from and opposingly facing each other so as to define an optical path from the light source to the light detector, and
- wherein, when the actuator is in the first position, the first extension member of the actuator is positioned to block the optical path, the second extension member of the actuator being positioned to block the optical path when the actuator is in the second position.

18. The apparatus of claim 15, wherein the controller is further configured to compare the detected closure speed of the cover with a reference speed.

19. The apparatus of claim 18, wherein the controller is further configured to delay the timing at which the one or more document size sensors detect the size of the document if the closure speed is determined to be slower than the reference speed, and to advance forward the timing at which the one or more document size sensors detect the size of the document if the closure speed is determined to be faster than the reference speed.

* * * * *